US009619774B2

United States Patent
Eckberg et al.

(10) Patent No.: US 9,619,774 B2
(45) Date of Patent: Apr. 11, 2017

(54) PRODUCT TRACKING SYSTEM

(75) Inventors: Eric Alan Eckberg, Rochester, MN (US); Eric Vance Kline, Rochester, MN (US); Paul N. Krystek, Highland, NY (US); Nathan Carl Mandelko, Chatfield, MN (US); Michael Robert Rasmussen, Mazeppa, MN (US); Arvind Kumar Sinha, Rochester, MN (US); Stephen M. Zins, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/224,231

(22) Filed: Sep. 1, 2011

(65) Prior Publication Data
US 2013/0060813 A1    Mar. 7, 2013

(51) Int. Cl.
*G06F 7/00* (2006.01)
*G06F 17/30* (2006.01)
*G06Q 10/08* (2012.01)
*G06F 21/35* (2013.01)
*G06F 21/62* (2013.01)

(52) U.S. Cl.
CPC ......... *G06Q 10/0833* (2013.01); *G06F 21/35* (2013.01); *G06F 21/6209* (2013.01); *G06F 2221/2101* (2013.01)

(58) Field of Classification Search
CPC . G06Q 10/0833; G06F 21/6209; G06F 21/35; G06F 2221/2101

USPC ................................ 707/736, 781, 783, 785
See application file for complete search history.

(56) References Cited

U.S. PATENT DOCUMENTS

| | | | |
|---|---|---|---|
| 6,774,361 | B2 | 8/2004 | Bawendi |
| 7,207,481 | B2 | 4/2007 | Barenburg |
| 7,261,235 | B2 | 8/2007 | Barenburg |
| 7,546,257 | B2 | 6/2009 | Hoffman |
| 2002/0133430 | A1* | 9/2002 | Coomber et al. ............... 705/27 |
| 2008/0052663 | A1* | 2/2008 | Cope et al. ................... 717/101 |
| 2008/0224823 | A1* | 9/2008 | Lawson et al. ................ 340/5.8 |
| 2010/0076872 | A1* | 3/2010 | Nakamura ....................... 705/28 |
| 2010/0243746 | A1* | 9/2010 | Nettesheim ...... G06K 19/07716 235/494 |
| 2010/0324997 | A1* | 12/2010 | Evans ........................ 705/14.69 |
| 2011/0016193 | A1* | 1/2011 | Reisman ....................... 709/217 |
| 2012/0136739 | A1* | 5/2012 | Chung ......................... 705/26.1 |

* cited by examiner

*Primary Examiner* — Md. I Uddin
(74) *Attorney, Agent, or Firm* — David A. Mims, Jr.; Joseph Petrokaitis; Robert V. Wilder

(57) ABSTRACT

A method, programmed medium and system are disclosed which provide increased secure tracking of materials and products through the use of a unique coding scheme. The coding scheme contains a unique security code identifier issued by a sole certification agency, and includes a non-coded scheme for public information, and a coded scheme for private information regarding the sourcing and development of materials and products. The disclosure provides for full tracking of a product throughout the supply chain by only certified participants. The disclosed system allows for increased secure tracking of materials and products, and allows for access to greater amounts of information at various stages of manufacture and/or assembly regarding a given material or product.

12 Claims, 5 Drawing Sheets

PRODUCT TRACKING SYSTEM

FIELD OF THE INVENTION

The present invention relates generally to information processing systems and more particularly to a methodology and implementations for enabling the tracking of product development and assembly from parts to end-products.

BACKGROUND OF THE INVENTION

There is an ever increasing need to accurately track materials and products and be able to access related data throughout the material or product's useful life. With globalization, the tracking of materials and products now faces ever-increasing threats of fraud and a new method and/or process of combating this threat is needed. In addition, there is a growing social consciousness interested in all aspects of information regarding a material and product. For example, such aspects may include environmental impact, origin of material and product, and risk factors related to materials and products. Many industries have been actively attempting to combat source or authenticity fraud (such as electronic components, clothing, food, etc.), but with limited success. Many governments have great interest in food risk management, accuracy of the tracking of food sources and preventing needless sickness and death when a quality problem exists with in the food supply chain.

Accordingly, there is a need to provide an improved product tracking system and methodology in order to address the above-noted concerns.

SUMMARY OF THE INVENTION

A method, programmed medium and system are disclosed which provide increased secure tracking of materials and products through the use of a unique coding scheme. The coding scheme contains a unique security code identifier issued by a sole certification agency, and includes a non-coded scheme for public information, and a coded scheme for private information regarding the sourcing and development of materials and products. The disclosure provides for full tracking of a product throughout the supply chain by only certified participants. The disclosed system allows for increased secure tracking of materials and products, and allows for access to greater amounts of information at various stages of manufacture and/or assembly regarding a given material or product.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
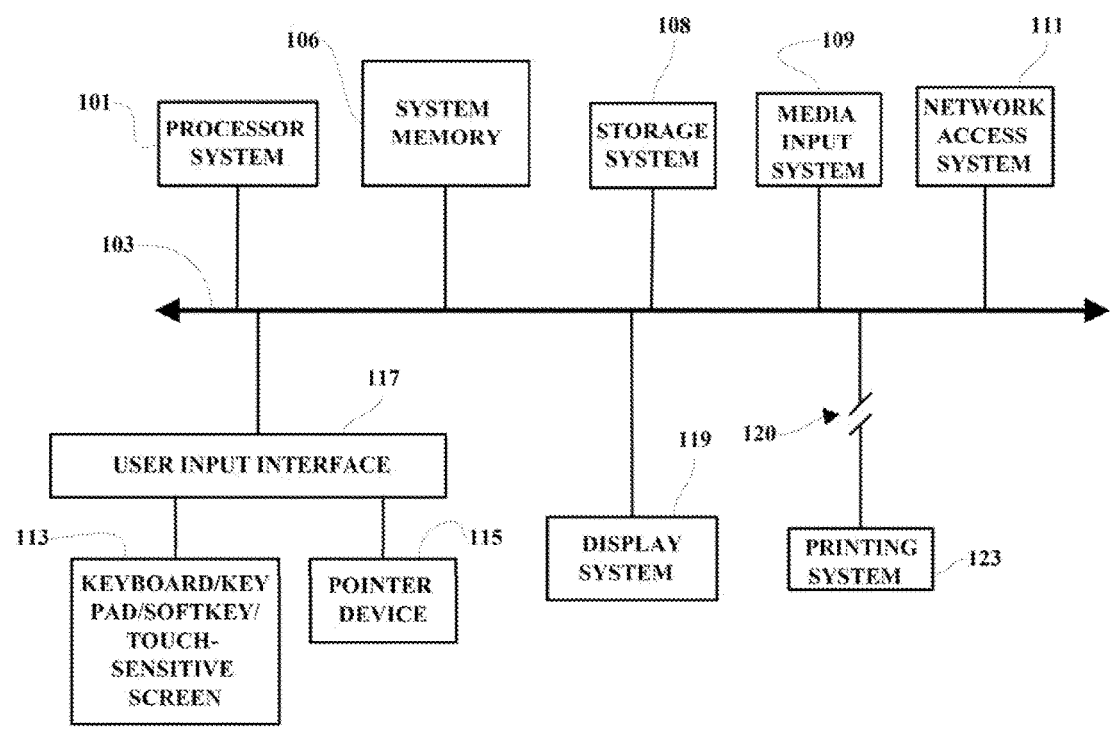
FIG. 1 is an illustration of one embodiment of a system in which the present invention may be implemented.

The various methods discussed herein may be implemented within a computer system which includes, inter alia, processing means, memory, storage means, input means, display means and an operating system and a windows management unit. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a personal computer system, it is understood that disclosed methodology may also be applied in a more extensive network system as well as in many other available and future devices and systems such as cell phones and personal wireless and other hand-held devices, including any input device, including touch-sensitive screens or touch-sensitive input pads, to achieve the beneficial functional features described herein.

The present invention allows for increased secure tracking of materials and products. A secure coding scheme is created through all parties in the supply chain receiving certification to a standard created and maintained by a sole certification agency. A coding scheme includes a security code assigned by the certification agency to a specific lot of material or product. The code can be used with any industry standard labeling scheme such as 2D or 3D bar codes, RFID, microdot etc. For products made of multiple materials, this process can be repeated for each material used in a product. The coding scheme consists of two concatenated parts. The first part of codes identify open information such as: Country of Origin; Commodity; Expiration Date; etc. This information would be publicly readable though open definitions provided the certification agency. The second part of the concatonated code is an encrypted unique product identifier, used to control access to that product's secure data such as: Manufacturer/Supplier; Date Code; Lot Code; Quantity; Current Owners of Inventory; Owner Inventory Quantity; etc.

Throughout the supply chain only certified participants add information to a central database maintained by the certification agency. Secure login and encryption protects the integrity of the data entered into the database from valid data providers (the true/original data source), which improves and assures data integrity. Public data is available to all parties and does not require certification to read the public data. As material moves along the supply chain the last possession of the material or product is tracked and this will help defray fraud by having full traceability within the supply chain with the unique security code. Data continues to be added to the public and secure databases during a material and products useful life. After useful life (varies by commodity) a code may be re-used for efficiency, to a very different commodity (ex. food commodity to electronic component commodity) to combat fraud. A distinctive identity can be used by certified participants to identify materials and products that flow through this more secure data system.

Value Added Service providers are enabled to access the public data to provide real time information to retailers and consumers during product selection and sale. For example a retailer can dynamically display information on a material or products life within the supply chain including information which is becoming increasingly used by consumers in material and product selection (source of material, related environmental information, shipping method, age etc.) and other related information made available though Value Added Service producers or the original Sources for things such as nutrition information for food products or independent product ratings from consumer groups for electronic products. Consumers are enabled to choose products with lower risks of allergic reactions by getting detailed data on a foods contents or fertilizers or pesticides used to grow the food. Detailed information of organic foods or locally produced foods can be made available to consumers. Once an electronic component lot has been consumed at a card assembler, this information is logged back to the database to indicate that this lot of product would be considered fraudulent if the database was checked during a potential sales traction of the same product with an "expired" (out of useful life) security code. This process effectively combats the sale of fraudulent electronic and other components and products since labels would no longer have a valid security code and could be stopped upon checking with the authentic product tracking database.

Secure information is useful for governments monitoring of safety issues within the supply chain. Consumers could notify the government of safety issues which would link back immediately to a "Sources" manufacturing lot. Government warning could go directly to the whole supply chain since information regarding who acquired the material or product will have been logged in to the secure portion of the tracking database. Secure data can be accessed by those meeting the certification requirements with a valid need to know. Quarantining defective or dangerous material or products can be achieved more quickly since the location of suspect material will be contained within the tracking data base. This process also prevents the spread of suspect material by preventing the next level of supply chain transaction (e.g. halt the sale from a distributor to retailer, or from retailer to the consumer) because the code is read during each transaction across the supply chain. In the present disclosure, the term "Pedigree" and/or "ePedigree" is used to refer to a certified central database containing product tracking data information including, inter alia, country of origin, commodity, expiration date, manufacturer/suppliers, date codes, lot codes, quantity, current owners of inventory and owner inventory quantity. Although the disclosed exemplary embodiment discusses only a single Pedigree server and site, it is understood that the Pedigree database may be contained in one or more, or a series of servers and server sites which may be accessed by authorized personnel.

With reference to the drawings, FIG. 1 illustrates an exemplary embodiment of a computer system in which the present invention may be implemented. As shown, a processor system 101, which may include one or more processors, is connected to a main bus 103. The main bus 103 is also coupled to, inter alia, system memory 106. A local storage system 108, a media input system 109, a network access system 111 and a user input interface 117 are also connected to the main bus 103. The user input interface 117 is arranged to receive user inputs from a keyboard or keypad or softkey device 113 or a pointer device 115 such as a mouse. The main bus 103 is also connected to a display system 119. The input and/or display system may also comprise a touch-sensitive screen or optically-sensitive input pad (not shown). The exemplary system illustrated may also includes a printer device 121, which may be remotely located 120 from the other system components. The computer system shown in FIG. 1 may be implemented in a central server system in which case the storage system 108 contains the Pedigree database. The FIG. 1 system may also be implemented in a pad or laptop computer device, or a mobile computer device which may be used to access the main Pedigree server and Pedigree database to enter and/or display and/or retrieve product tracking data.

Figure 2:
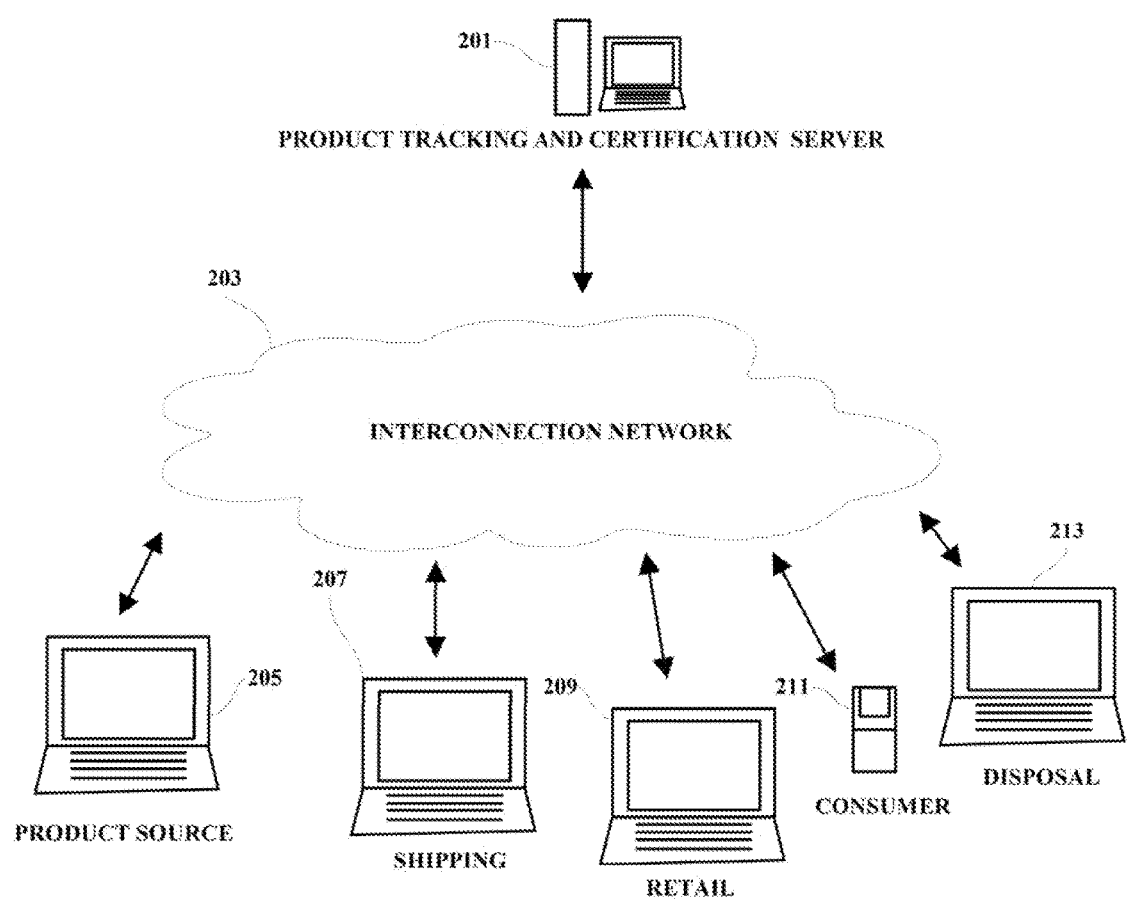
FIG. 2 is an illustration of a network implementation of the disclosed system.

In FIG. 2, there is shown a network configuration for an exemplary implementation of the present invention. As shown, a product tracking (PT) and certification server 201 is accessible through an interconnection network 203, for example the Internet, by various computer systems, including, but not limited to, computer systems belonging to various product or parts sources 205, shipping operations 207, retail establishments 209, consumers 211 and disposal operations 213. The PT server 201 is accessible, for example, by the various parts and sub-systems suppliers and assemblers for hardware products, as well as by code contributors for software or computer products, and also by food processing operations at all stages. For example, for food processing operations, the product tracking database would contain the end food product as well as the date and location of harvesting, packaging and shipping for the final food product, and also for the food product components where appropriate. As noted earlier, not all of the enterprises taking part in providing a final product would have access to all of the information contained in the PT database. For example, some of the information may be considered proprietary or confidential information of the supplier of the information. Such sensitive information would be stored in a secure portion of the PT database and made available only to authorized individuals and enterprises.

Figure 3:
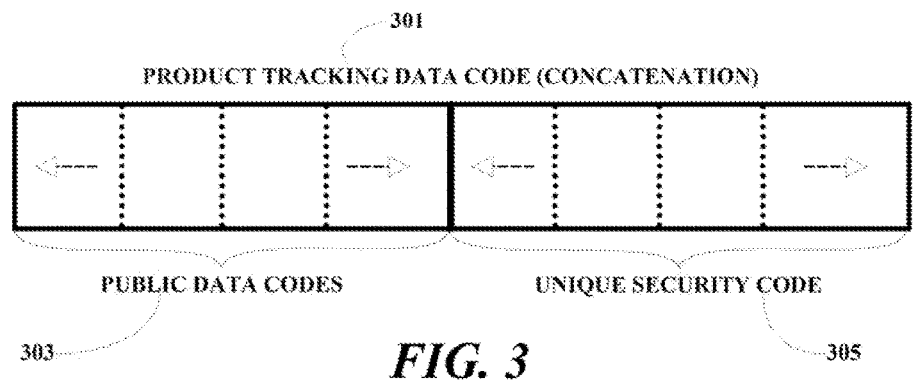
FIG. 3 is an illustration of an exemplary product tracking data code.

An exemplary PT data code is illustrated in FIG. 3. As shown, the PT code 301 is a concatenation of two types of codes, a public data code 303 containing PT data available to the public, and also a unique security code 305 containing coded data which is not available to the public. Both the public data 303 and the secure data 305 are made up of a series of segments as shown, with each segment containing a different data type. For example, the public data code 303 would contain segments to identify country of origin, commodity type, expiration date, etc., for products in the product tracking database. The secure data codes 305 would contain segments to identify, for example, inter alfa, manufacturer/supplier, date code, lot code, quantity, current owners of inventory, owner inventory quantity, etc. Each product in the PT database has its own PT data code including both public and secure segments, and, subject to security processing as hereinafter explained, all PT code segments are searchable to locate particular products of interest.

Figure 4:
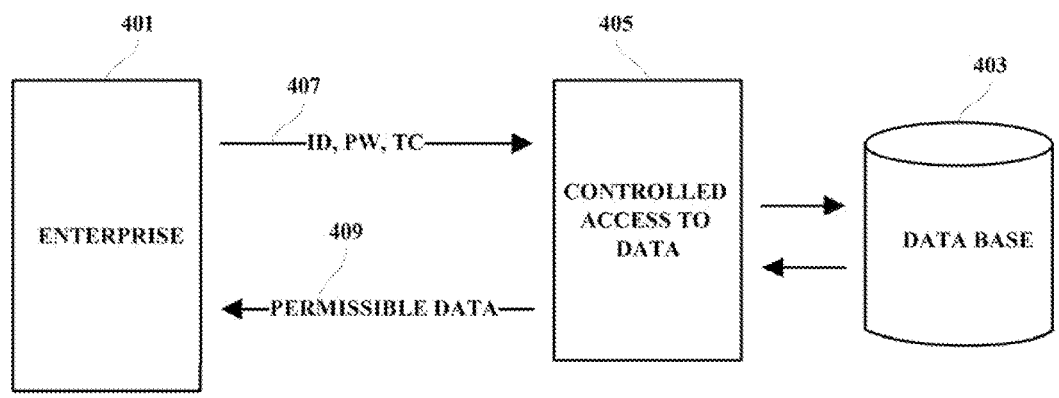
FIG. 4 is an illustration showing an access sequence for accessing the product tracking database.

FIG. 4 shows an exemplary flow path for accessing information contained in the PT database when the product tracking code is known. In one example, an enterprise 401 may access the PT database 403 through a controlled access operation 405 by inputting 407 the enterprise ID, the enterprise pass word (PW) and the tracking code (TC) which may be read from a product. If the enterprise is authorized 405 to have access to the product tracking information for the particular product associated with the input tracking code, then the permissible data authorized to be accessed by the requesting enterprise is returned 409 to the enterprise. It is noted that not all data may be permitted to be accessed by all enterprises in a supply chain for a given product and access may be based, at least in part, on user or requestor role and assigned access level. For example, a shipper may be authorized to have access to destination, mode of transport, shipment time and place data, but may not be authorized to access product supplier information for any given product.

Figure 5:
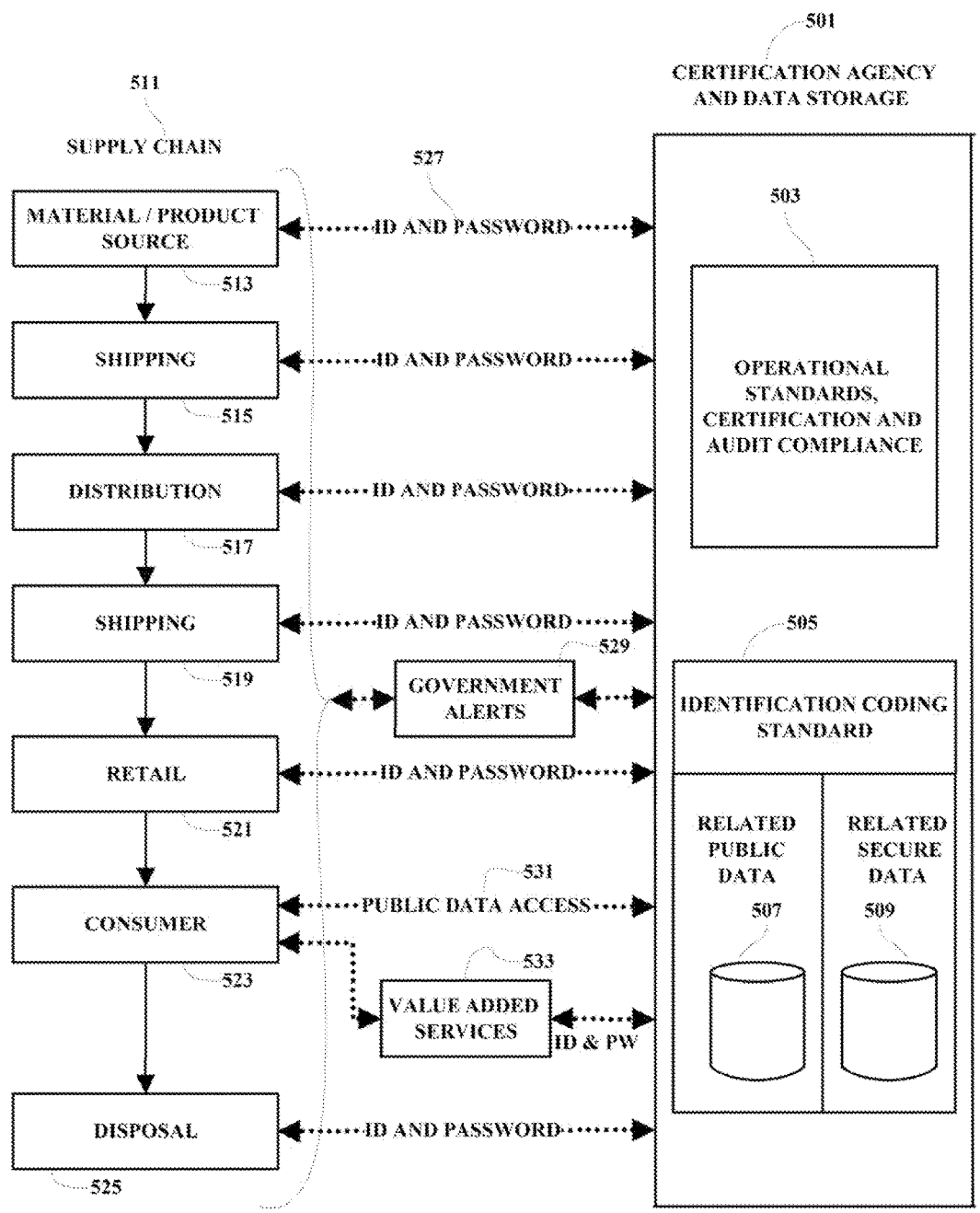
FIG. 5 is an illustration showing a supply chain interface with a Certification Agency containing a product tracking database.

FIG. 5 is an illustration showing an exemplary supply chain 511 for a product, and how each entity in the supply chain may interface with a Certification Agency and Data Storage system 501. The agency server storage contains Operational Standards, Certification and Audit Compliance provisions 503 as well as the identification standard 505 and respective databases for public data 507 and secure data 509 of the product tracking database. An exemplary supply chain includes a material or product source 513, a shipping operation 515, a distribution center 517, a distribution shipping function 519, a retail outlet 521, a consumer 523 and finally a disposal operation 525. The disposal operation 525 may be, for example, a recycling operation which will input and track products when they are destroyed and/or re-cycled. FIG. 5 also shows a Government Alert operation 529 through which safety alerts may be received from and sent to suppliers and passed through to the product tracking database and to others accessing the product tracking database. Another entity for after-market or value added services 533 is illustrated to include enhancements to products or complementary products to original equipment manufacturers. In general, when an entity accesses the PT database contained at the Certification Agency server 501, the requesting agency will input the entity's ID and Password 527. The Certification Agency 501 will determine the appropriate security/data access level of the requesting entity and return the requested information as appropriate for the requesting entity. Consumers 523 may not be required to have an ID and Password in order to access the Agency 501 but consumers will have access only to the public portion of the PT database 507. In general, it is presumed that product safety alerts will be included in the public data records portion 507 for products in the PT database 505.

Figure 6:
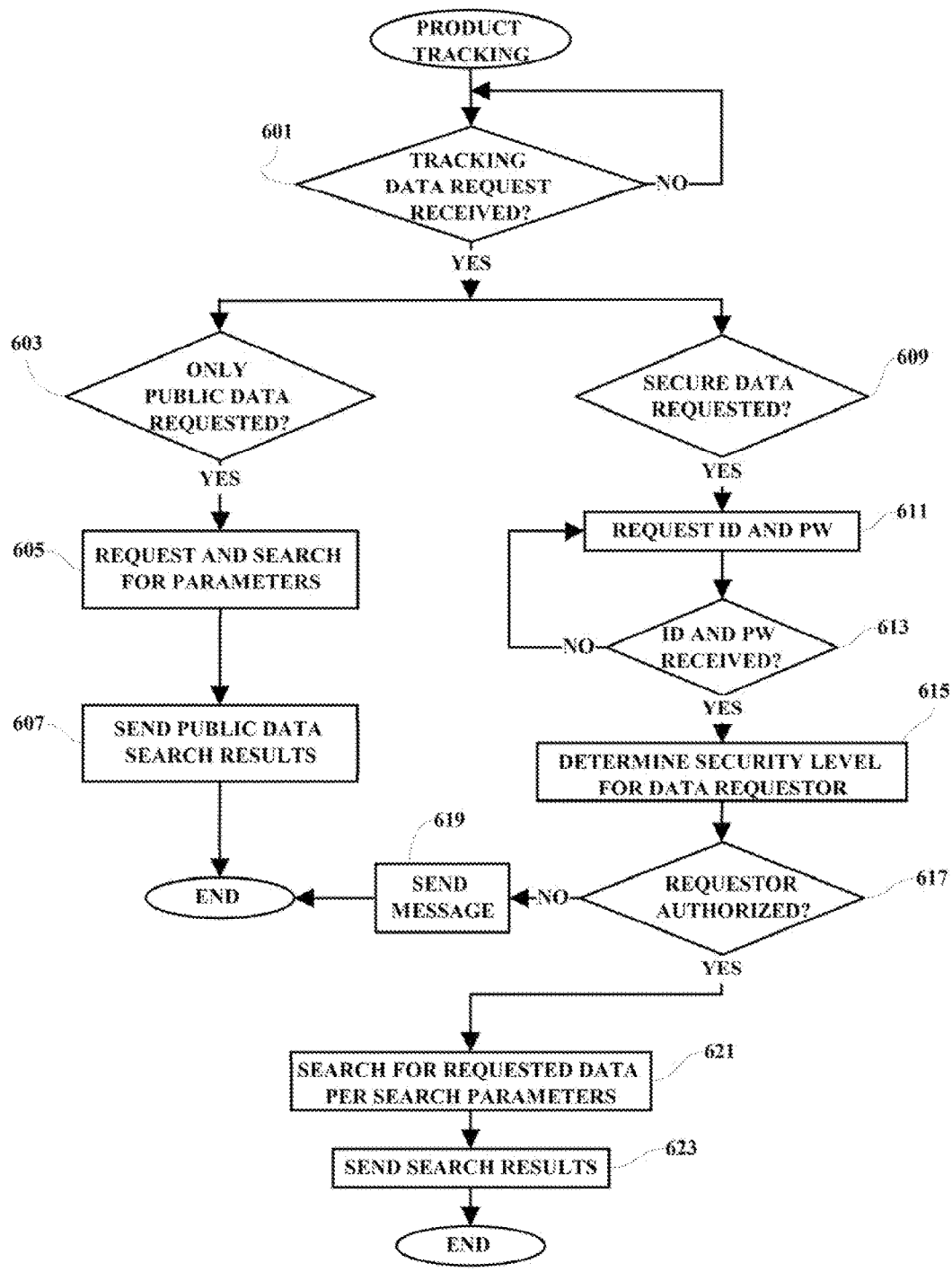
FIG. 6 is a flow chart illustrating an exemplary sequence of operations in an exemplary embodiment of the present invention.

As shown in FIG. 6, an exemplary operational sequence in one implementation of the product tracking system begins when a tracking data request is received 601 by a product data tracking processing system. A determination is made as to whether the received request is for only public data 507 or for secured data 509. If only public data is requested 603, search parameters are requested and searched for in the PT database. As noted earlier, such parameters may include only the PT code taken from product packaging or may include one or more of the segment elements of the public data code 303. A search is conducted of the public data storage 507 and the search results are then sent 607 to the requesting entity. If the initial data request includes a request to access secure data 609, then the system requests 611 the ID and pass word of the requesting entity when the ID and pass word of the requesting entity is received 613, a check is made 615 to determine if the security level of the requesting entity is sufficient to permit access to the requested secure data. If the requestor is authorized 617, then a search for the requested data is conducted 621 and the search results are returned to the requesting entity 623. If the requesting entity is not authorized to receive the requested data 617, then an appropriate notice is sent 619 to the requesting entity and the processing ends.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a computer program product comprising a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A machine-implemented and/or software-implemented method comprising:

providing product information related to manufacturing or distribution of a product, said product being sequentially processed by a series of manufacturing or distribution processing entities as said product is being moved through a supply chain, each of said processing entities being operable to perform a respective designated task relative to said product, said product information being contained in a product information database of a single server system accessible from remote computer systems through an interconnection network;

receiving public and non-public product information related to said product from each of said processing entities, said public and non-public product information being furnished by each of said respective processing entities in real time to said product information database during or upon completion of each designated task by said respective processing entities;

converting said public and non-public product information from all of said processing entities into a single, product tracking code, said product tracking code being comprised of coded public and non-public segments;

storing said public product information in a first portion of said product information database;

storing said non-public product information in a second portion of said product information database;

using said product tracking code for enabling public access to said public product information in said first portion of said product information database; and using said product tracking code for enabling only authorized access to said non-public product information in said second portion of said product information database, said product information data base, including information being furnished by said processing entities, being made available for access during or upon completion of each designated task by said respective processing entities;

assigning a password to each of said processing entities for accessing said second portion of said product information database;

checking said password submitted by said processing entities against a listing of authorized passwords; and enabling each of said processing entities to access said second portion of said product information database containing said non-public product information only if said password submitted matches with said password assigned to said processing entity accessing said product information database, wherein each of said processing entities is allowed access only to non-public product information of predetermined other ones of said processing entities.

2. The method as set forth in claim 1 wherein said product is offered for sale to a purchasing public.

3. The method as set forth in claim 2 wherein said public product information and said non-public product information is provided by a plurality of said processing entities, each of said processing entities having a specific function in bringing said product to a market for sale, wherein each processing entity is enabled to access only said non-public product information which is related to said each processing entity's function.

4. The method as set forth in claim 1 wherein said product is a hardware or software product.

5. The method as set forth in claim 1 wherein said product is a food, drug or agricultural product.

6. The method as set forth in claim 1 wherein said product information is encoded into first and second portions of an encoded tag, said first portion of said encoded tag containing an encoding of said public product information, said second portion of said encoded tag containing an encoding of said non-public product information, said encoded tag being designed to be available with said product, said encoded tag being usable for identifying said product in said product information database.

7. A non-transitory, computer-readable, tangible storage device(s) and computer-readable program instructions stored on the computer-readable, tangible storage device(s) comprising:

providing product information related to manufacturing or distribution of a product, said product being sequentially processed by a series of manufacturing or distribution processing entities as said product is being moved through a supply chain, each of said processing entities being operable to perform a respective designated task relative to said product, said product information being contained in a product information database of a single server system accessible from remote computer systems through an interconnection network, the computer-readable program instructions, when executed by a processing system;

receiving public and non-public product information related to said product from each of said processing entities, said public and non-public product information being furnished by each of said respective processing entities in real time to said product information database during or upon completion of each designated task by said respective processing entities;

converting said public and non-public product information from all of said processing entities into a single, product tracking code, said product tracking code being comprised of coded public and non-public segments;

storing said public product information in a first portion of said product information database;

storing said non-public product information in a second portion of said product information database;

using said product tracking code for enabling public access to said public product information in said first portion of said product information database; and using said product tracking code for enabling only authorized access to said non-public product information in said second portion of said product information database, said product information data base, including information being furnished by said processing entities, being made available for access during or upon completion of each designated task by said respective processing entities;

assigning an access code to each of said processing entities for accessing said second portion of said product information database;

checking said access code submitted by said processing entities against a listing of authorized access codes; and enabling each of said processing entities to access said second portion of said product information database containing said non-public product information only if said access code submitted matches with said access code assigned to said processing entity accessing said product information database;

wherein each of said processing entities is allowed access only to non-public product information of predetermined other ones of said processing entities.

8. The non-transitory computer-readable, tangible storage device(s) as set forth in claim 7 wherein said product is offered for sale to a purchasing public.

9. The non-transitory computer-readable, tangible storage device(s) as set forth in claim 8 wherein said public product information and said non-public product information is provided by a plurality of said processing entities, each of said processing entities having a specific function in bringing said product to a market for sale, wherein each processing entity is enabled to access only said non-public product information which is related to said each processing entity's function.

10. The non-transitory computer-readable, tangible storage device(s) as set forth in claim 7 wherein said product information is encoded into first and second portions of an encoded tag, said first portion of said encoded tag containing an encoding of said public product information, said second portion of said encoded tag containing an encoding of said non-public product information, said encoded tag being designed to be available with said product, said encoded tag being usable for identifying said product in said product information database.

11. A system comprising:
means for providing product information related to manufacturing or distribution of a product, said product being sequentially processed by a series of manufacturing or distribution processing entities as said product is being moved through a supply chain, each of said processing entities being operable to perform a respective designated task relative to said product, said product information being contained in a product information database of a single server system accessible from remote computer systems through an interconnection network;
a server for receiving public and non-public product information related to said product from each of said processing entities, said public and non-public product information being furnished by each of said respective processing entities in real time to said product information database during or upon completion of each designated task by said respective processing entities;
a processing system operable for converting said public and non-public product information from all of said processing entities into a single, continuous product tracking code, said product tracking code being comprised of coded public and non-public segments;
a storage device for storing said public product information in a first portion of said product information database, said storage device being further operable for storing said non-public product information in a second portion of said product information database;
means for using said product tracking code for enabling public access to said public product information in said first portion of said product information database; and
means for using said product tracking code for enabling only authorized access to said non-public product information in said second portion of said product information database, said product information data base, including information being furnished by said processing entities, being made available for access during or upon completion of each designated task by said respective processing entities;
assigning a password to each of said processing entities for accessing said second portion of said product information database;
checking said password submitted by said processing entities against a listing of authorized passwords; and
enabling each of said processing entities to access said second portion of said product information database containing said non-public product information only if said password submitted matches with said password assigned to said processing entity accessing said product information database, wherein each of said processing entities is allowed access only to non-public product information of predetermined other ones of said processing entities.

12. The system as set forth in claim 11 wherein said product information is encoded into first and second portions of an encoded tag, said first portion of said encoded tag containing an encoding of said public product information, said second portion of said encoded tag containing an encoding of said non-public product information, said encoded tag being designed to be available with said product, said encoded tag being usable for identifying said product in said product information database.

* * * * *